United States Patent [19]

Armitage

[11] Patent Number: 4,619,501
[45] Date of Patent: Oct. 28, 1986

[54] CHARGE ISOLATION IN A SPATIAL LIGHT MODULATOR

[75] Inventor: David Armitage, Los Altos, Calif.

[73] Assignee: The United States of America as represented by the Secretary of the Air Force, Washington, D.C.

[21] Appl. No.: 689,699

[22] Filed: Jan. 8, 1985

[51] Int. Cl.$^4$ .................. G02F 1/135; G02F 1/015; G02F 1/03

[52] U.S. Cl. .................. 350/386; 350/342; 350/356

[58] Field of Search .............. 350/356, 386, 392, 342; 365/106, 114, 120, 126

[56] References Cited

U.S. PATENT DOCUMENTS

| | | | |
|---|---|---|---|
| 3,740,734 | 6/1973 | Maldonado | 340/173 LM |
| 3,801,966 | 4/1974 | Terao | 340/173 LM |
| 3,823,998 | 7/1974 | Yazaki et al. | 350/150 |
| 3,912,391 | 10/1975 | Fleisher et al. | 355/54 |
| 4,432,071 | 2/1984 | Szabo | 365/124 |

OTHER PUBLICATIONS

"A Fast Silicon Photoconductor–Based Liquid Crystal Light Valve", P. O. Braatz, K. Chow, U. Efron, J. Grinberg and M. J. Little, IEEE International Electron Devices Meeting, pp. 540–543, 1979.

"Oblique-Cut LiNbO$_3$ Microchannel Spatial Light Modulator", C. Warde and J. I. Thakara, Optics Letters, vol. 7, No. 7, Jul. 1982.

"A First-Order Model of a Photo-Activated Liquid Crystal Light Valve", J. D. Michaelson, SPIE vol. 218, Devices and Systems for Optical Signal Processing, 1980.

"LiNbO$_3$ and LiTaO$_3$ Microchannel Spatial Light Modulators", C. Warde, A. M. Weiss and A. D. Fisher, SPIE vol. 218, Devices and Systems for Optical Signal Processing, 1980.

"Silicon Liquid Crystal Light Valves: Status and Issues", U. Efron, P. O. Braatz, M. J. Little, R. N. Schwartz and J. Grinberg, Proc. SPIE vol. 388, Jan. 1983.

Primary Examiner—John K. Corbin
Assistant Examiner—B. S. Shapiro
Attorney, Agent, or Firm—Donald J. Singer; Richard J. Donahue

[57] ABSTRACT

A spatial light modulator having a lattice of microgrooves formed on the surface of the silicon photodiode nearest the electro-optic cyrstal to prevent lateral charge transfer at this surface.

4 Claims, 2 Drawing Figures

CHARGE ISOLATION IN A SPATIAL LIGHT MODULATOR

STATEMENT OF GOVERNMENT INTEREST

The invention described herein may be manufactured and used by or for the Government for governmental purposes without the payment of any royalty thereon.

BACKGROUND OF THE INVENTION

The present invention relates generally to the field of optical signal processing apparatus, and more specifically to a spatial light modulator of simplified construction and improved performance.

Two-dimensional spatial light modulators are devices which allow control of an optical wavefront for processing or imaging operations. These devices, often referred to as light valves in the literature, have potential for application in large screen display systems as well as in optical data processing systems, including missile guidance and robotic vision systems. Listed below are several articles which describe their construction and operation.

1. "A Fast Silicon Photoconductor-Based Liquid Crystal Light Valve", P. O. Braatz, K. Chow, U. Efron, J. Grinberg and M. J. Little, IEEE International Electron Devices Meeting, pp 540–543, 1979. 2. "Oblique-cut $LiN_bO_3$ Microchannel Spatial Light Modulator", C. Warde and J. I. Thakara, Optics Letters, Vol. 7, No. 7, July 1982.
3. "A First-Order Model of a Photo-Activated Liquid Crystal Light Valve", J. D. Michaelson, SPIE Vol. 218, Devices and Systems For Optical Signal Processing, 1980.
4. "$LiNbO_3$ and $LiTaO_3$ Microchannel Spatial Light Modulators", C. Warde, A. M. Weiss and A. D. Fisher, SPIE Vol. 218, Devices and Systems for Optical Signal Processing, 1980.
5. "Silicon Liquid Crystal Light Valves: Status and Issues", U. Efron, P. O. Braatz, M. J. Little, R. N. Schwartz and J. Grinberg, Proc. SPIE Vol. 388, January 1983.

Basically, spatial light modulators generally comprise a photosensitive semiconductor substrate or wafer, a light blocking layer, a dielectric mirror and an electro-optic crystal (which may be a liquid crystal), arranged in a sandwich-like composite structure, and having a voltage applied thereacross. A control (write) illumination impinges on the face of the photosensitive semiconductor while an output (read) illumination makes a double pass through the electro-optic crystal.

The photosensitive semiconductor responds to intensity variations in the control illumination impinging thereon. In the dark, most of the voltage applied across the composite structure appears across the reverse-biased photodiode. The write beam, however, excites carriers in the silicon, which are driven by the internal field to the Si-electro-optic crystal interface. The voltage across the silicon decreases, while the voltage across the electro-optic crystal increases. The read illumination passes through the electro-optic crystal, is reflected off of the dielectric mirror, and again passes through the electro-optic crystal before emerging from the device. Since the diffraction efficiency of the electro-optic crystal is a function of the voltage applied thereacross, (which is a function of the intensity of the write illumination), optical control of the output (read) illumination is achieved.

One of the problems encountered in the practical implementation of such spatial light modulators is that of lateral charge transfer in the semiconductor device. By this is meant that the charge formed in the photosensitive semiconductor spreads at the surface of the semiconductor nearest the electro-optic crystal, resulting in poor spatial resolution.

One solution to the lateral charge transfer problem is mentioned by P. O. Braatz et al in the article entitled "A Fast Silicon Photoconductor-Based Liquid Crystal Light Valve", supra. It is stated therein that the spatial resolution of the input image across the silicon can be retained by means of a boron-implanted p-grid at the $Si/SiO_2$ interface. The boron implanted p-grid acts to focus the incoming electrons into the resolution cell defined by it, as well as to form charge buckets of the electrons already residing at the $Si/SiO_2$ interface. The overall result is to prevent lateral spill-over and consequent smearing of the charge pattern.

The aforementioned solution to the lateral charge transfer problem, however, is not without its own problems. The fabrication of low leakage p-n junctions in high resistivety Si is a difficult art, and the high temperature processing involved often leaves the Si surface distorted, degrading the performance of the device.

SUMMARY OF THE INVENTION

It is therefore the general object of the present invention to provide improved structure for eliminating the charge transfer problem in spatial light modulator devices.

It is a further object of the present invention to provide a novel and cost effective means for eliminating the charge transfer problem in spatial light modulators.

Briefly, in the spatial light modulator device of the present invention, a lattice of microgrooves is formed on the surface of a silicon wafer, instead of the boron implanted p-grid. Since the electric field direction always has a component in the silicon photodiode to electro-optic crystal direction, the surface charge accumulation in the silicon is confined to a region less than one micrometer from the surface of the silicon. Thus, it has been found and experimentally verified that an easy way to prevent lateral charge movement can be achieved by an etched grid pattern greater than one micrometer in depth.

BRIEF DESCRIPTION OF THE DRAWINGS

This invention together with its objects, features and advantages may be better understood from the following detailed description when read in conjunction with the drawing, in which.

DETAILED DESCRIPTION OF THE INVENTION

Figure 1:
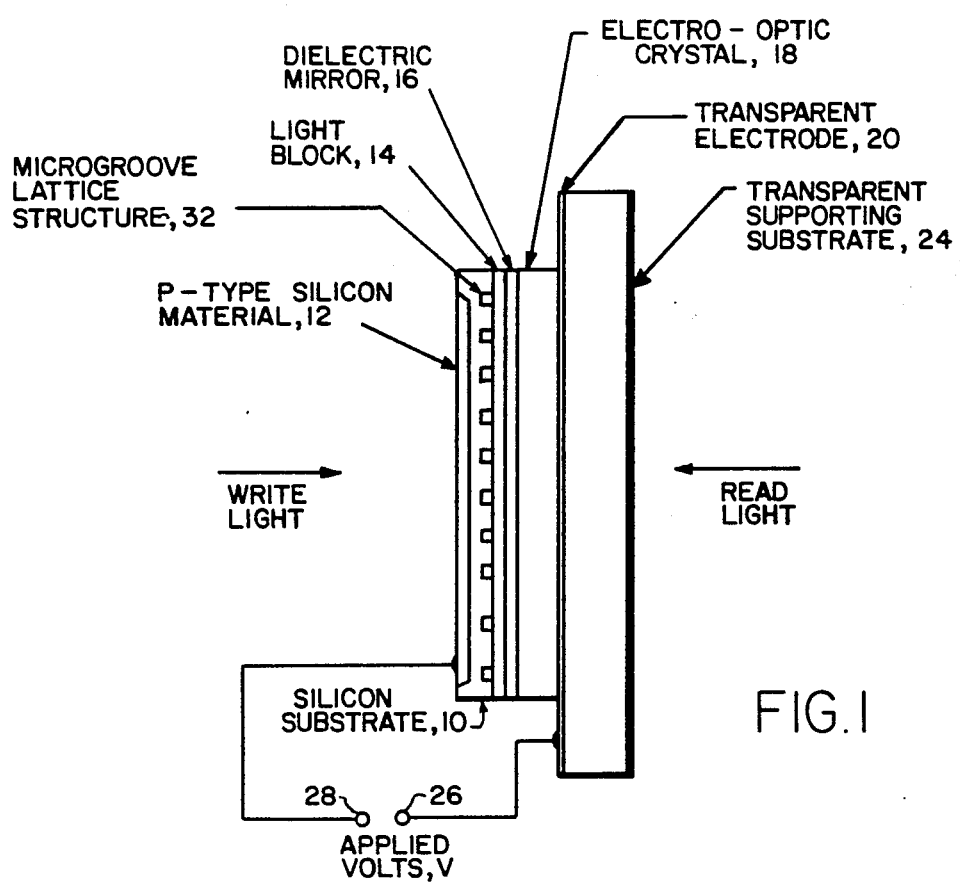
FIG. 1 is a diagram of a spatial light modulator constructed in accordance with a specific embodiment of the invention.

FIG. 1 is a diagram depicting the side view of the spatial light modulator of the present invention. The various components thereof have not been drawn to scale in view of the large differences in their thicknesses. Representative thickness values are provided below to facilitate an understanding of the invention.

The modulator has a substrate 10 formed of silicon material having a thickness in the order of 100 microns. A p-type silicon material 12 of approximately 0.1 microns is diffused in the exposed surface thereof to form a silicon photodiode. The inner surface of silicon substrate 10 is adjacent a layer of light blocking material 14, having a thickness in the order of one micron. In certain applications, this light blocking layer 14 may be unnecessary. Light blocking layer 14 is affixed to a dielectric mirror 16 and it, in turn is affixed to an electro-optic crystal 18 having a thickness in the order of 100 microns.

As mentioned above, the light blocking layer may be omitted. The dielectric mirror transmits about 0.1% of the read illumination to the silicon substrate 10. In some applications this is not critical. If required, further isolation is provided by an absorbing or light blocking layer 14 having a thickness less than 10 microns to avoid degrading the resolution of the device. The conductivity of the layer must be low to avoid charge confinement leakage.

Electro-optic crystal 18 is affixed to a transparent electrode 20 having a thickness of approximately 0.25 microns and formed on one surface of a transparent supporting substrate 24 having a thickness in the order of 15 millimeters. Transparent electrode 20 provides a uniform initial electric field across electro-optic crystal 18. A first electrical terminal 26 is connected to the transparent electrode 20 and a second electrical terminal 28 is connected to the p-type material 12 diffused in silicon substrate 10. A voltage V is applied across the terminals 26 and 28.

Optical quality and voltage requirements would suggest that electro-optic crystal 18 be formed of lithium niobate, lithium tantalate or potassium dideuterium phosphate. The transparent supporting substrate 24 may be formed of calcuim fluoride. As mentioned earlier, the present invention contemplates the use of a microgroove lattice structure which is demarked by the reference numeral 32.

Figure 2:
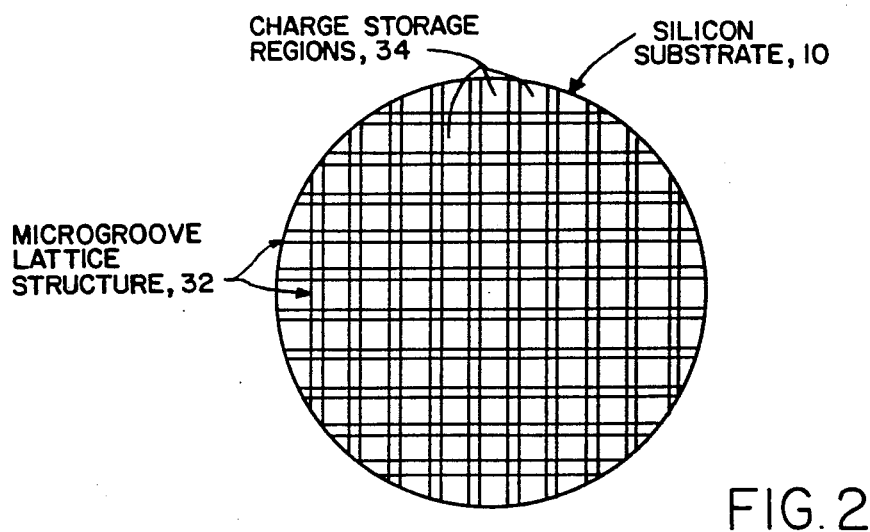
FIG. 2 is a diagram of the grooved surface of the silicon photodiode shown in FIG. 1 of the drawings.

FIG. 2 provides a top view of the silicon substrate 10 where the microgroove lattice structure 32 can be more clearly seen. A typical separation between the microgrooves would be 30 micrometers. The depth of the microgrooves below the surface of silicon substrate 10 is preferrably at least one micrometer to assure confinement of the charge in each of the localized charge storage regions 34 formed between the microgrooves.

The operation of the spatial light modulator shown in FIG. 1 is essentially the same as disclosed earlier. The control illumination, which could in some applications be the fringe pattern of an input hologram, excites electrons and holes in the silicon photodiode formed in silicon substrate 10. Electrons are driven by the internal electric field in the diode to the silicon substrate 10/electro-optic crystal 18 interface. (Since the light blocking layer 14 and dielectric mirror 16 are thin and of high resistivity, they can be ignored in this analysis.) This surface charge pattern in the silicon substrate 10 gives rise to a transversely varying voltage pattern containing the same information as the charge pattern. The voltage pattern modulates the index of refraction of the electro-optic crystal 18. The index variations are sensed with the read beam which reconstructs the hologram.

The dielectric mirror 16 is necessary for the read operation and prevents the read beam from destroying the charge pattern at the surface of silicon substrate 10 by creating more charge carriers in the silicon. The light-blocking layer 14, if used, attenuates any read beam leakage through the dielectric mirror 16. The transparent electrode 20 in conjunction with the applied voltage V, provides a uniform initial field across the electro-optic crystal 18. When the read operation has been completed, the voltage V may be removed from across the terminals 26 and 28, and the transversely varied charge pattern will discharge to equilibrium.

Although the invention has been described with reference to a particular embodiment, it will be understood to those skilled in the art that the invention is capable of a variety of alternative embodiments within the spirit and scope of the appended claims.

What is claimed is:

1. A spatial light modulator which comprises:
   a silicon substrate having a first surface and an opposed second surface, and having p-type silicon material diffused in the first surface thereof to form a photodiode;
   a dielectric mirror having a first surface and an opposed second surface, the first surface thereof being adjacent the second surface of said silicon substrate;
   an electro-optic crystal having a first surface and an opposed second surface, the first surface thereof being adjacent the second surface of said dielectric mirror;
   a transparent electrode having a first surface and an opposed second surface, the first surface thereof being adjacent the second surface of said electro-optic crystal;
   a transparent supporting substrate having a first surface and an opposed second surface, the first surface thereof being adjacent the second surface of said transparent electrode;
   means for applying a voltage between said p-type material and said transparent electrode; and
   a lattice configuration of microgrooves formed in the second surface of said silicon substrate to form a matrix of charge storage regions therein and prevent lateral charge transfer between said regions.

2. Apparatus as defined in claim 1 wherein said microgrooves have a depth of at least one micron and a width of at least one micron.

3. Apparatus as defined in claim 2 wherein the separation between the microgrooves in said lattice configuration is at least thirty microns.

4. Apparatus as defined in claim 1 and further comprising:
   a light blocking layer interposed between said silicon substrate and said dielectric mirror.

* * * * *